(12) United States Patent
Athas et al.

(10) Patent No.: US 10,204,303 B2
(45) Date of Patent: Feb. 12, 2019

(54) METHOD AND APPARATUS FOR CONTEXTUAL CONTENT SUGGESTION

(71) Applicant: Nokia Technologies Oy, Espoo (FI)

(72) Inventors: Gregory Joseph Athas, Lisle, IL (US); Piotr Buczak, Des Plaines, IL (US); Cesar Moreno, Forest Park, IL (US)

(73) Assignee: Nokia Technologies Oy, Espoo (FI)

( * ) Notice: Subject to any disclaimer, the term of this patent is extended or adjusted under 35 U.S.C. 154(b) by 920 days.

(21) Appl. No.: 14/720,190

(22) Filed: May 22, 2015

(65) Prior Publication Data

US 2015/0254557 A1      Sep. 10, 2015

Related U.S. Application Data

(63) Continuation of application No. 13/422,548, filed on Mar. 16, 2012, now Pat. No. 9,043,260.

(51) Int. Cl.
*G06F 15/18* (2006.01)
*G06N 5/02* (2006.01)
(Continued)

(52) U.S. Cl.
CPC ........... *G06N 5/02* (2013.01); *G06Q 30/0631* (2013.01); *G06Q 30/0639* (2013.01); *H04L 67/18* (2013.01)

(58) Field of Classification Search
CPC .................... G06F 17/30867; G06Q 30/02
(Continued)

(56) References Cited

U.S. PATENT DOCUMENTS 7,810,049 B2    10/2010 Werwath et al.
8,095,523 B2 *  1/2012 Brave ............... G06F 17/30867
                                                707/705
(Continued)

FOREIGN PATENT DOCUMENTS

CN          101154554 A     4/2008
EP          2393056 A1     12/2011

OTHER PUBLICATIONS

Office Action for corresponding Chinese Patent Application No. 20180025544.7, dated Oct. 16, 2017, English Language Summary Included, 10 pages.
(Continued)

*Primary Examiner* — David R Vincent
(74) *Attorney, Agent, or Firm* — Ditthavong & Steiner, P.C.

(57) ABSTRACT

An approach is provided for contextual content suggestion. A recommendation platform processes and/or facilitates a processing of contextual information associated with at least one device to determine one or more locations, one or more contextual parameter values, or a combination thereof. The recommendation platform also determines popularity data associated with one or more content items with respect to the one or more locations, the one or more contextual parameter values, or a combination. The popularity data is determined from one or more other devices sharing at least substantially the one or more locations, the one or more contextual parameter values, or a combination thereof. The recommendation platform then causes, at least in part, a recommendation of the one or more content items to the at least one device based, at least in part, on the popularity information.

20 Claims, 15 Drawing Sheets

(51) Int. Cl.
  *G06Q 30/06* (2012.01)
  *H04L 29/08* (2006.01)
(58) Field of Classification Search
  USPC .................................................. 706/15, 45
  See application file for complete search history.

(56) References Cited

U.S. PATENT DOCUMENTS

| | | |
|---|---|---|
| 2010/0280920 A1 | 11/2010 | Scott et al. |
| 2012/0077522 A1 | 3/2012 | Mate et al. |
| 2012/0143859 A1 | 6/2012 | Lymperopoulos et al. |
| 2012/0278825 A1* | 11/2012 | Tran ................... G06Q 30/04 725/13 |
| 2013/0030994 A1* | 1/2013 | Calman ............... G06Q 30/02 705/40 |

OTHER PUBLICATIONS

International Search Report for corresponding International Patent Application No. PCT/FI2013/050209 dated Jul. 1, 2013, 4 Pages.
Written Opinion of the International Searching Authority for corresponding International Patent Application No. PCT/FI2013/050209 dated Jul. 1, 2013, 10 pages.
Office Action for corresponding Chinese Patent Application No. 201380025544.7 dated Feb. 6, 2017, English Language Summary Included, 13 pages.

* cited by examiner

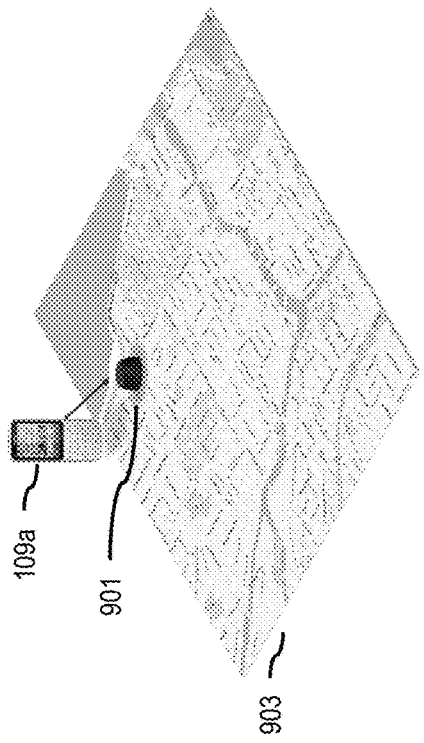
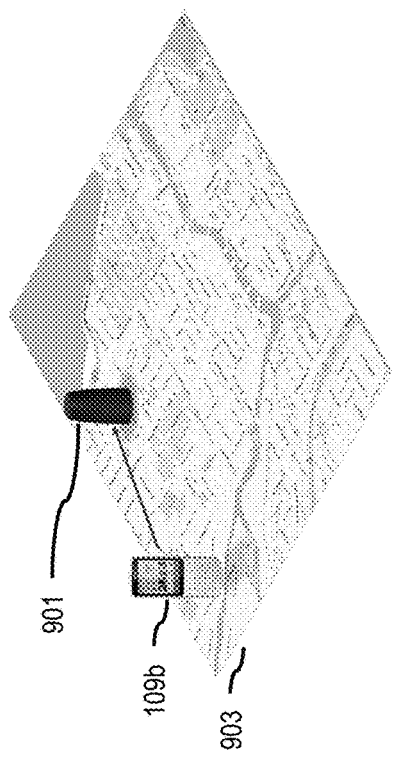
FIG. 9A
FIG. 9B

METHOD AND APPARATUS FOR CONTEXTUAL CONTENT SUGGESTION

RELATED APPLICATION

This application is a continuation of prior U.S. patent application Ser. No. 13/422,548, entitled "Method and Apparatus for Contextual Content Suggestion," filed Mar. 16, 2012, which is incorporated herein in its entirety.

BACKGROUND

Wireless (e.g., cellular) service providers and device manufacturers are continually challenged to deliver value and convenience to consumers by, for example, providing compelling network services, applications, and content. One area of development relates to providing services to assist users in filtering through the growing amounts and varieties of available services, applications, and content to discover content of interest. However, such services often rely on potentially burdensome manual user configuration and/or effort, which can lead to a poor user experience and lower usage rates. Accordingly, service providers and device manufacturers face significant technical challenges to overcoming such burdens by enabling efficient content suggestion and discovery.

Some Exemplary Embodiments

Therefore, there is a need for an approach for providing contextually-based content suggestion or recommendation that minimizes the burden placed on users.

According to one embodiment, a method comprises processing and/or facilitating a processing of contextual information associated with at least one device to determine one or more locations, one or more contextual parameter values, or a combination thereof. The method further comprises determining popularity data associated with one or more content items with respect to the one or more locations, the one or more contextual parameter values, or a combination. The popularity data is determined from one or more other devices sharing at least substantially the one or more locations, the one or more contextual parameter values, or a combination thereof. The method also comprises causing, at least in part, a recommendation of the one or more content items to the at least one device based, at least in part, on the popularity information.

According to another embodiment, an apparatus comprises at least one processor, and at least one memory including computer program code for one or more programs, the at least one memory and the computer program code configured to, with the at least one processor, cause, at least in part, the apparatus to process and/or facilitate a processing of contextual information associated with at least one device to determine one or more locations, one or more contextual parameter values, or a combination thereof. The apparatus is further caused to determine popularity data associated with one or more content items with respect to the one or more locations, the one or more contextual parameter values, or a combination. The popularity data is determined from one or more other devices sharing at least substantially the one or more locations, the one or more contextual parameter values, or a combination thereof. The apparatus also causes, at least in part, a recommendation of the one or more content items to the at least one device based, at least in part, on the popularity information.

According to another embodiment, a computer-readable storage medium carries one or more sequences of one or more instructions which, when executed by one or more processors, cause, at least in part, an apparatus to process and/or facilitate a processing of contextual information associated with at least one device to determine one or more locations, one or more contextual parameter values, or a combination thereof. The apparatus is further caused to determine popularity data associated with one or more content items with respect to the one or more locations, the one or more contextual parameter values, or a combination. The popularity data is determined from one or more other devices sharing at least substantially the one or more locations, the one or more contextual parameter values, or a combination thereof. The apparatus also causes, at least in part, a recommendation of the one or more content items to the at least one device based, at least in part, on the popularity information.

According to another embodiment, an apparatus comprises means for processing and/or facilitating a processing of contextual information associated with at least one device to determine one or more locations, one or more contextual parameter values, or a combination thereof. The apparatus further comprises means for determining popularity data associated with one or more content items with respect to the one or more locations, the one or more contextual parameter values, or a combination. The popularity data is determined from one or more other devices sharing at least substantially the one or more locations, the one or more contextual parameter values, or a combination thereof. The apparatus also comprises means for causing, at least in part, a recommendation of the one or more content items to the at least one device based, at least in part, on the popularity information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 9A-9D are diagrams of depicting an overview of providing contextual content recommendations, according to various embodiments;

DESCRIPTION OF PREFERRED EMBODIMENT

A method and apparatus for providing contextual content suggestion are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
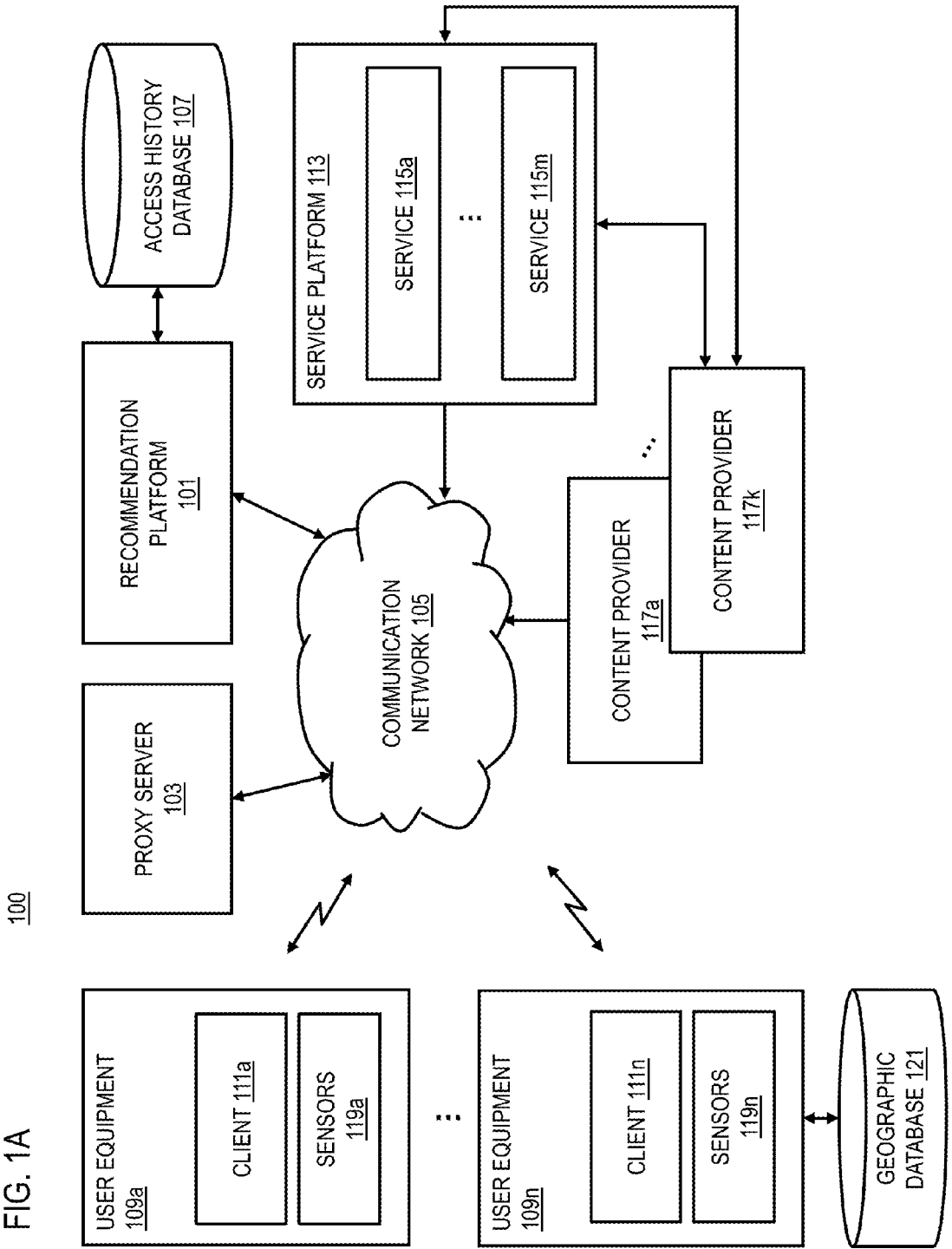
FIG. 1A is a diagram of a system capable of providing contextual content suggestions, according to one embodiment.

FIG. 1 is a diagram of a system capable of providing contextual content suggestions, according to one embodiment. As noted above, content discovery can be problematic for users. For example, with respect to web-based content, in order for web browser users to discover content on the web, the users generally have to either manually enter an address for the content (e.g., a Universal Resource Identifier (URI) such as a Universal Resource Locator (URL)) or click on a provided link. This means, for instance, that the user has to know the URI of the content or that the provided link is of value to the specific user. This limitation can make discovery of new and/or relevant content difficult.

Historically, there are many services that try to assist users in discovering content. However, most have an incomplete view of the users content (e.g., location and/or other context parameters such as time, activity, etc.) and, therefore, generally cannot provide relevant content suggestions or recommendations without requiring extra effort by the user (e.g., checking-in, joining a social graph, performing searches, etc.).

To address this problem, a system 100 of FIG. 1 introduces the capability to provide contextual content suggestions by leveraging the aggregate usage patterns of a crowd (e.g., a group of devices). In one embodiment, the aggregate usage patterns are determined in real time or substantially real time to calculate the popularity (also referred to as popularity data or "traction") of various content items as a function one or more user contexts (e.g., location, time, activity, role, intent, etc.). The system 100 can then use the popularity data or traction to make content suggestions based on a specific user's context.

In other words, the system 100 records content access or usage patterns (e.g., web browsing patterns) of users as relative their specific contexts. When a particular user accesses the system 100 under a specific context (e.g., at a specific location at a certain time), the system 100 will present that particular user with a list of content suggestions (e.g., web links) that are relevant to the user based on the popularity of the content items with other users sharing the same or similar contexts. The various embodiments of the approach described herein differ from other recommendation engines in that the system 100 does not require any active participation by its users. For example, the various embodiments are a passive solution where users do not need to create an account, check-in, perform searches, etc. in order to discover content.

One potential use case for the various embodiments for providing contextual content suggestions described herein is targeted advertisement. Targeted advertisement is very important to advertisers (e.g., business owners) since this kind of advertisement typically yields better results (e.g., click through rates) than non-targeted advertisements. However, even if some web sites have the users profiled enough to render targeted advertisements that are relevant regardless of the users' contexts (e.g., where their users are geographically), at some point these advertisements can become irrelevant. For example, a user who likes skiing might get advertisements about skiing equipment, but if the user is temporarily in another context such as a sunny beach location, advertisement about skiing equipment will most likely be irrelevant. Instead, to increase the potential effectiveness of an advertisement, the advertisement needs to reflect the context of the user. With the approach described herein, the user need not take any active steps to express his or her preferences under specific contexts because the system 100 can make recommendations based on the popularity of content (e.g., advertising content) with other users sharing the same or similar context.

In one embodiment, the content items may be suggested to the system 100 using crowdsourcing means. In addition or alternatively, business owners, government agencies, and/or any person/entity may actively promote or suggest content items for recommendation by the system 100. In one embodiment, the person or entity who wishes to promote a content item (e.g., a link to their web site) can make use of the system 100 to make sure that their content item is seen by people accessing the system 100 under defined contexts. For example, a restaurant owner can use the system 100 to introduce a link or content item in a relevant geographic area. However, in order for the link or content item to become popular and therefore seen by users in the area, the link or content item has to be popular. For this case, there are, for instance, two possible scenarios: (1) the link or content item becomes popular on its own merits, which will imply that users are requesting the link or content item independently; or (2) the business owner can pay to add traction or popularity to the link and force the link to be popular and therefore be seen by users.

In one embodiment, the system 100 implements a popular decay mechanism whereby if a user clicks on said link, the link can stay popular or increase in traction in the system 100. However, if people do not click on the link or content item, the link will eventually decrease in popularity (e.g., decay) to a point where it is removed from the system due to lack of popularity or traction.

As shown in FIG. 1, the system 100 comprises a recommendation platform 101 operating in conjunction with a proxy server 103 that provides for proxy web browsing over the communication network 105. The recommendation platform 101 processes content usage or access patterns to determine popularity data or traction for content items under specific contexts (e.g., location, time, and other contextual parameters). In one embodiment, the content usage or access patterns are stored in the access history database 107. In another embodiment, the system 100 enables users (e.g., via user equipment (UEs) 109a-109n—also collectively referred to as UEs 109) to be able to receive contextual content suggestions by way of the recommendation platform 101.

In one embodiment, the proxy server 103 is part of a proxy browsing architecture that centralizes the collection of content usage or access patterns. However, it is noted that although the various embodiments are described with respect to determining context usage patterns via the proxy server 103, it is contemplated that any other architecture (e.g., architectures that are not based on proxy browsing) that facilitates collection of content usage or access patterns may be used. For example, the UEs 109 may directly report (e.g., periodically or continuously) content usage or access patterns to the recommendation platform 101. In addition, although the recommendation platform 101 and the proxy server 103 are depicted as separate components, in some embodiments, the functions of the recommendation platform 101 may be included as or performed by one or more components of the proxy server 103 or any other component of the system 100. Similarly, in other embodiments, the functions of the proxy server 103 may be included in or performed by one or more components of the recommendation platform 101 or any other components of the system 100.

By way of example, proxy browsing is a technology that reduces the amount of data that needs to be transferred between a web server and a web browser. An intermediate proxy server located between a mobile device and the Internet may, for example, be used to reduce image sizes, simplify the HTML markup of a webpage, and compress transmitted data. Proxy browsing also allows for a reduction in hardware requirements for internet enabled mobile devices, faster rendering of webpages, and reduced bandwidth usage.

In addition to the proxy server 103, the proxy browsing architecture depicted in the example of FIG. 1 includes of one or more proxy clients 111a-111n (also collectively referred to as clients 111) operating within respective client devices (e.g., UEs 109a-109n). In one embodiment, the proxy clients 111 route at least a portion of the communication traffic from the UEs 109 through the proxy server 103. In some embodiments, the proxy clients 111 may be a browser application or a simplified version of a browser application. In addition or alternatively, the proxy clients 111 can be independent processes executing in the UEs 109, or can be incorporated in other applications executing in the UEs 109.

In one embodiment, the recommendation platform 101 detects when UEs 109 access the platform 101 and/or any other component of the system 100 and then provides contextually relevant content suggestions to the UEs 109 based on other devices sharing the same or similar contexts. In one embodiment, the proxy server 103 detects the access by the UEs 109 by, for instance, receiving requests from the proxy clients 111 to route communication traffic to the intended communication endpoints providing associated content items or links. In addition, the proxy server 103 can route return communication traffic from the communication endpoints to the any of the proxy clients 111 and/or UEs 109. By way of example, the communication endpoints can include a service platform 113, services 115a-115m (also collectively referred to as services 115), content providers 117a-117k (also collectively referred to as content providers 117), or any other component with connectivity to the communication network 105 (e.g., another UE 109). For example, the service platform 113, the service 115, and/or the content providers 117 may provide any number of content items, links, services, etc. (e.g., mapping services, social networking services, media services, content services, etc.) via a web server or other means of communications (e.g., text messaging, voice, instant messaging, chat, etc.). In other words, the communication endpoints represent a terminating point of communications from the proxy clients 111, and an originating point of communications to the proxy clients 111.

In some embodiments, the proxy server 103 receives requests from the proxy clients 111 to access service content, such as a webpage, web application, or other web content, and the proxy server 103 can perform any number of communications related functions for routing and/or processing the resulting communication traffic. For example, as noted above, the proxy server 103 can provide an optimized distributed script processing experience by delivering only new images of the web content, providing partial updates based on document mutations or differences, enabling pass-through or scripts for on-device changes (e.g., changes to CSS properties, CSS3 transitions, etc.). In other embodiments, the proxy server 103 may compress or otherwise modify content that is to be delivered to the proxy clients 111 based, at least in part, on one or more capabilities or characteristics of the receiving UE 109. For example, in wireless environments, the proxy server 103 can compress data for more efficient transmission, transform content to reduce the amount of data for transfer, reformat content for display in smaller screens, change the content to an image file, etc. The proxy server 103 may divide the service content into a series of subparts that may be equally or unequally parsed and sent to the UE 109 like a deck of cards based on any of the display capabilities or resolution of a display, available memory, a battery condition, and/or available power mode settings of the UE 109. In one embodiment, the proxy server 103 records the content requests, communication traffic, and/or related data as content usage or access patterns for storage in the access history database 107.

By way of example, the UE 109 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 109 can support any type of interface to the user (such as "wearable" circuitry, etc.).

In one embodiment, the UE 101 may also include or be associated with one or more sensors 119a-119n (collectively referred to as sensors 119) for determining location information and/or other contextual parameters. The sensors 119 may include any type of sensor that is compatible with the UE 109, such as a light sensor, a pressure sensor (e.g., barometer), a motion sensor (e.g., accelerometer), a location sensor (e.g., GPS), a direction sensor, an image sensor (e.g., camera), a sound sensor (e.g., microphone), etc. For example, a location sensor in addition to a direction sensor may allow the UE 109 to determine the location of the UE 109 as well as a direction that the UE 109 faces to assist in determining one or more contexts associated with the UE 109.

In another embodiment, the outputs determined from the sensors 119 may be correlated to one or more contextual databases to determine particular contextual values. For example, the geocoordinates obtained from a location sensor may be evaluated against a geographic database 121 to correlate the geocoordinates to specific geographic features, areas, locations, etc. (e.g., road networks, paths, points of interest, etc. for different modes of transport including walking, driving, biking, etc.).

Figure 1B:
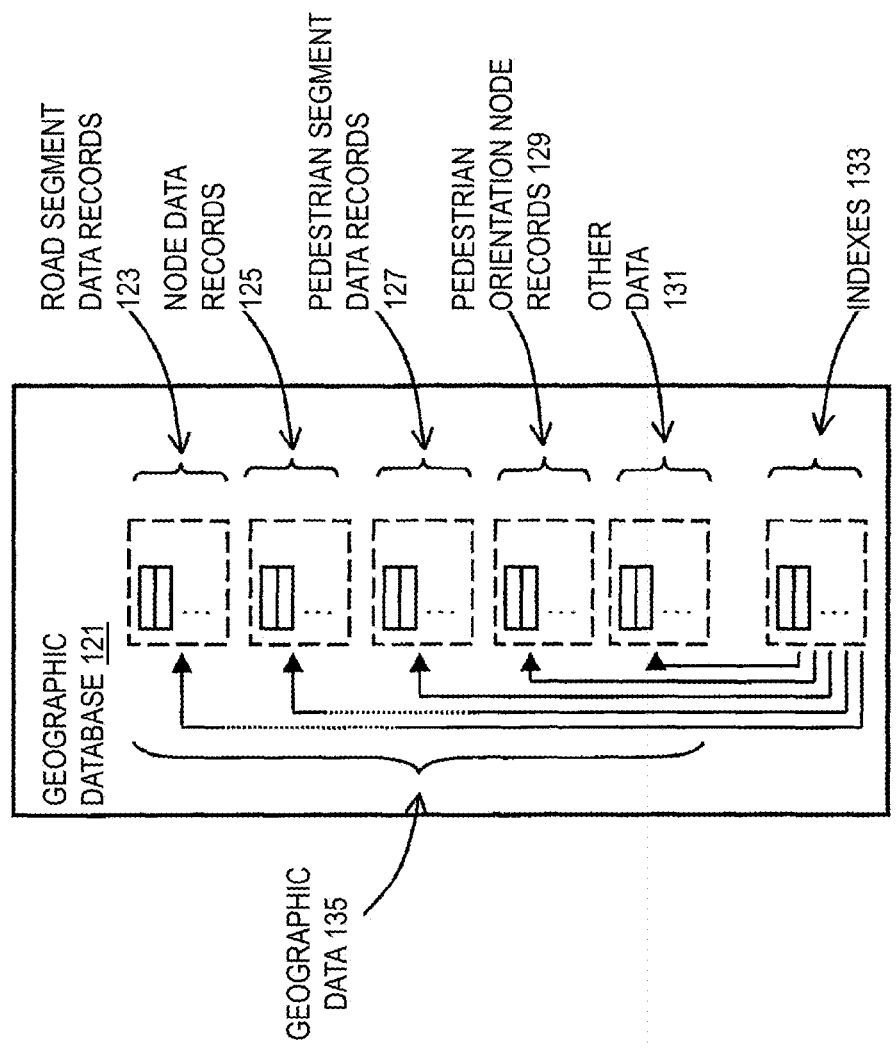
FIG. 1B is a diagram of a geographic database used for providing contextual content suggestions, according to one embodiment.

FIG. 1B depicts an example geographic database 121 that contains geographic data 135 that represents some of the physical geographic features in one or more geographic areas associated with the UE 109. By way of example, the data 135 contained in the geographic database 121 includes data that represent one or more road networks. Accordingly, in one embodiment of FIG. 1B, the geographic database 121 contains at least one road segment data record 123 for each road segment in the geographic region of interest. The geographic database 121 also includes a node data record 125 for each node in the geographic region. The terms "nodes" and "segments" represent only one terminology for describing these physical geographic features, and other terminology for describing these features is intended to be encompassed within the scope of these concepts. For example, the geographic database 121 may also include data for specific modes of transport such as pedestrian segment data records 127 and pedestrian orientation node records 129.

In one embodiment, the geographic database 121 may also include other kinds of data 131. The other kinds of data 131 may represent other kinds of geographic features or anything else such as points of interest data. For example, the point of interest data may include point of interest information comprising a type (e.g., the type of point of interest, such as restaurant, hotel, city hall, police station, historical marker, banking center, golf course, etc.), location of the point of interest, a phone number, hours of operation, etc. The geographic database 121 also may include indexes 133. In one embodiment, the indexes 133 may include various types of indexes that relate to other aspects of the data contained in the geographic database 121. For example, the indexes 133 may relate to the nodes in the node data records 125 with the end points of a road segment in the road segment data records 123. As another example, the indexes 133 may relate point of interest data in the other data records 131 with a road segment in the segment data records 127.

Additionally, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

Communication is facilitated among the recommendation platform 101, the proxy server 103, the UEs 109, and the clients 111 via the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the proxy clients 111, the proxy server 103, and/or the recommendation platform 101 interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
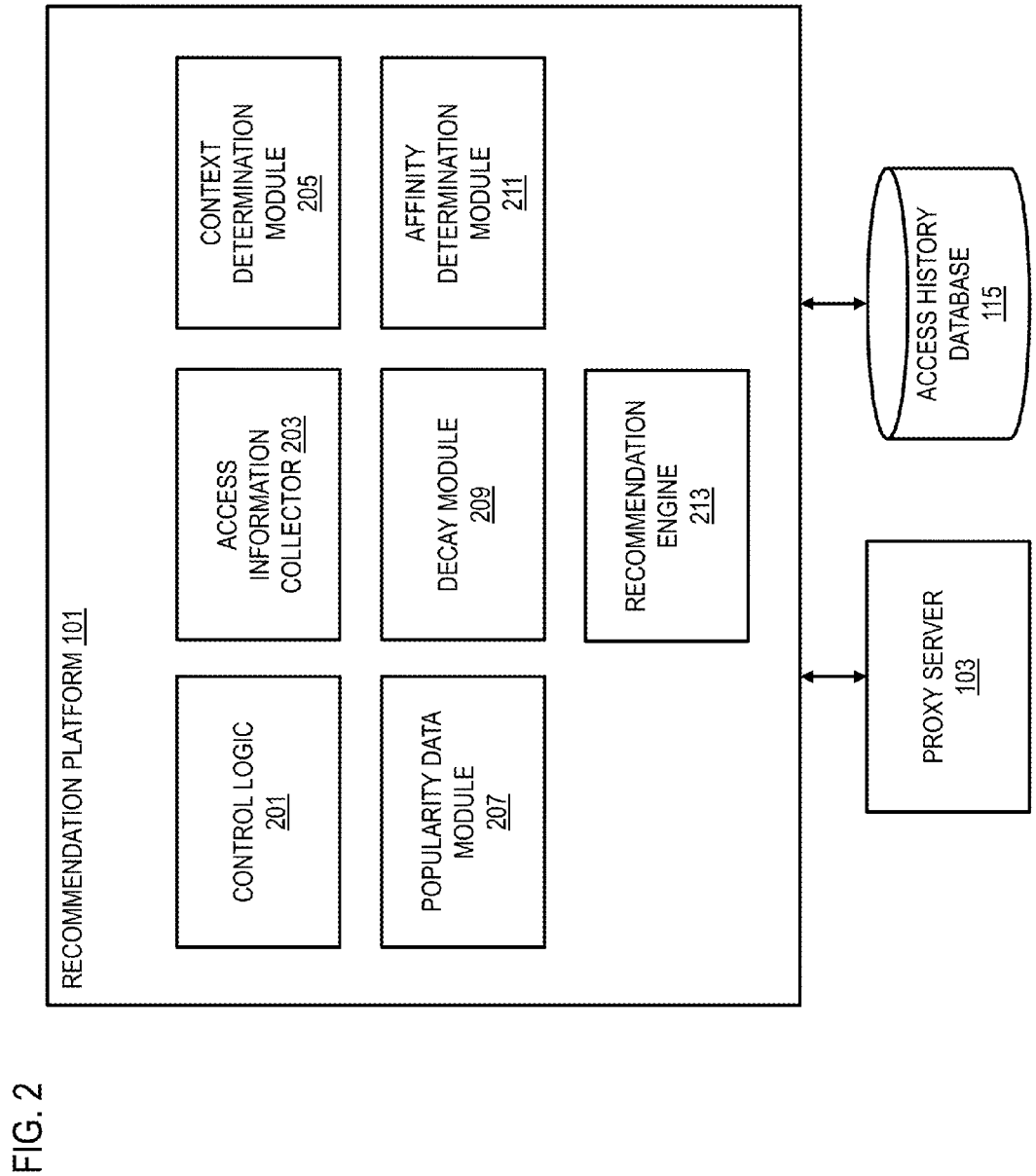
FIG. 2 is a diagram of components of a recommendation platform for providing contextual content suggestions, according to one embodiment.

FIG. 2 is a diagram of components of a recommendation platform for providing contextual content suggestions, according to one embodiment. By way of example, the recommendation platform 101 includes one or more components for providing proxy-based sharing of access histories. It is contemplated that the functions of these components may be combined in one or more components or performed by other components of equivalent functionality.

In this embodiment, the recommendation platform 101 includes a control logic 201, an access information collector 203, a context determination module 205, a popularity data module 207, a decay module 209, an affinity determination module 211, and a recommendation engine 213.

More specifically, the control logic 201 executes at least one algorithm for performing one or more functions of the recommendation platform 101. For example, the control logic 201 interacts with the access information collector 203 to record (e.g., directly or via the proxy server 103) content usage and/or access patterns. For example, when a client 111 requests access to a content item (e.g., by visiting a URI of the content item), the system 100 can add the content item to a list content items that can be recommended. In one embodiment, when adding the content item, the access information collector 203 can tag the content item record with one or more contextual parameters (e.g., geolocation, time, activity, or other contextual parameters) associated with the UE 109 accessing or requesting access to the content item. For example, with a respect to a geolocation contextual parameter, the access information collector 203 will record the geolocation of the UE 109 (e.g., the geocoordinates reflecting the position on the Earth's surface) associated with the UE 109 when the content (e.g., URI) was accessed or visited.

In addition or alternatively, the system access information collector 203 may record or associate any other contextual parameter (e.g., time of access, activity of the UE 109 or user when accessing the content, intent of the user when accessing the content, etc.) in place of or in combination with the one or more locations of the UE 109. In one embodiment, the access information collector 203 interacts with the context determination module 205 to infer or otherwise determine one or more contexts for the accessed content item by, for instance, evaluating the types and values of the associated contextual parameters. For example, accessing a content item at the same location but at different times of the day may give rise to different contexts. In some cases a hierarchy of the contexts may be created with, for instance, location as a root level of the hierarchy and then branching to other levels corresponding to different contextual parameters (e.g., time, activity, intent, etc.). Each combination of contextual parameters may give rise to different contexts that can be associated with a particular content item access record.

In another embodiment, in addition to associating geolocation information with the content item record, the access information may further assign each geo-tagged content item (e.g., URI) to a geographical "box". By way of example, boxes are used to subdivide geographical areas into smaller areas that are of a scale appropriate for users to find nearby content. Boxes, for instance, are typically administrative regions such as neighborhoods, post code regions, counties, etc. Although the term box is used, it is contemplated that a box may be of any shape (e.g., regular or irregular) or size. Another advantage of using the box approach is to limit the number of access records to process for generating contextual content suggestions or recommendations. For example, the system 100 need only evaluate the box or neighboring boxes associated with a location or predicted location of a device to make the content suggestions or recommendations.

After adding a content item to the system 100 (e.g., based on crowdsourcing or promotion), the access information collector 203 interacts with the popularity data module 207 to determine a popularity metric (e.g., such as the traction metric described above) or other type of popularity data with the content item. In one embodiment, traction is a term used to describe the popularity index for a content item (e.g., a URI). In some embodiments, the traction may be determined with respect to a given geographical box or other defined geographical area. For example, the higher the traction, the more popular a content item or link is said to be within its box. In one embodiment, when a content item or link is accessed by a client 111, the content item is given an initial or default traction value in addition to the contextual parameter values (e.g., location, time, intent, activity, etc.) described above. As described in more detail below, additional interaction with the content item under the same contexts can increase the traction or popularity (also referred to generally as popularity data).

In order to effectively maintain a set of content items in the system 100 that are relevant as a function of time, the system 100 can use a method for reducing or decaying the popularity or traction of content items as the go unused overtime. Accordingly, in some embodiments, the popularity data module 207 interacts with the decay module 209 to apply one or more decay functions to the respective traction values for the content items in the system. It is contemplated that any decay function may be used including, at least in part, time-based decay functions, impression penalty decay functions, maximum box traction decay functions, geometric progression decay functions, pay-to-play decay functions, and the like. Use of a decay function, for instance, ensures that old, no longer relevant links disappear naturally, thereby decreasing the chance that noise from things like random browsing will trend up locally. Example applications of the various types of decay functions are described in further detail below.

In some embodiments, when making contextual content recommendations, the recommendation platform includes an affinity determination module 211 to determine contextual distances between a potentially recommended content item a UE 109 or client 111 for which a recommendation is to be made. In one embodiment, the contextual distances are dependent on the contextual parameter itself. For example, if the contextual parameter of interest is geolocation, the contextual distance corresponds to physical distances. Similarly, for time, the contextual distance is a difference in time-of-day, day-of-week, month, season, or any other time unit. Based, the contextual distances, the affinity determination module 211 can adjust the traction applied specific content items to determine whether to recommend the content items. For example, greater distances can be used to reduce the traction applied between a content item and the subject client 111. So, in this way, the closest items (e.g., based on contextual distance) are recommended to the user.

Contextual distance or affinity determination may also be used in embodiments where content items are assigned to geographical boxes. In some cases, presenting the user with suggested content items from a specific box might prove to be inaccurate. For example, if the user is located close to a border between adjacent boxes representing respective geographical areas, some content items in the adjacent box may actually be closer than content items in box in which the client 111 is located. Accordingly, in some embodiments, the affinity determination module 211 may select to look for content items in adjacent boxes and/or may use contextual distance calculations across adjacent boxes to provide information to the recommendation engine 213 to make the appropriate recommendations.

In one embodiment, the recommendation engine 213 processes the aggregated popularity data (e.g., traction) associated with each content item based on the context of a particular client 111 to recommend the most relevant content items for the client's context. In one embodiment, the content usage patterns from a group of clients 111 are collected in real-time or substantially real-time because many of the calculations for determining contexts and popularity data for the content items are made "on-the-fly" while adding or updating a content item in the system 100 based on access requests from the clients 111. In a proxy-based system, the access requests are automatically detected by the proxy server 103 and forwarded to the recommendation platform 101 for real-time or near real-time processing. In non-proxy-based systems, the clients 111 may, for instance, send access requests or usage data directly to the recommendation platform 101 for processing (e.g., either periodically or continuously).

In addition, because of the real-time nature of some embodiments, the system 100 can support both highly localized (e.g., based on location, time, and/or other contextual parameters) trend spikes as well as content items that are spread broadly but are very popular over large ranges, times, or other contextual distances.

Figure 3:
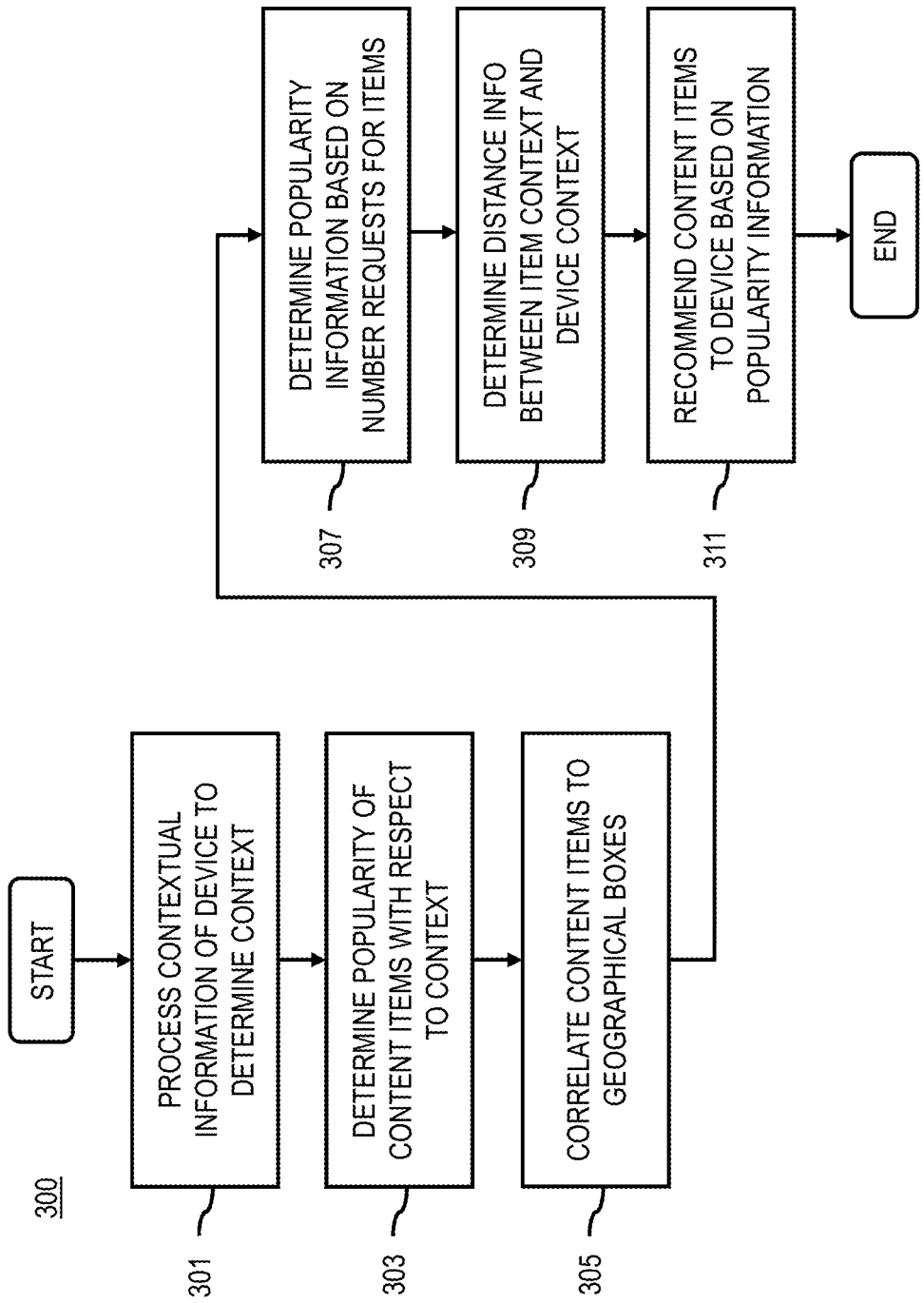
FIG. 3 is a flowchart of a process for providing contextual content suggestions, according to one embodiment.

FIG. 3 is a flowchart of a process for providing contextual content suggestions, according to one embodiment. In one embodiment, the recommendation platform 101 performs the process 300 and is implemented in, for instance, a chip set including a processor and a memory as shown FIG. 11. In addition or alternatively, the proxy server 103 may perform all or a portion of the process 300. At step 301, the recommendation platform 101 processes and/or facilitates a processing of contextual information associated with at least one device to determine one or more locations, one or more contextual parameter values, or a combination thereof. In one embodiment, the processing of the contextual information is triggered when a client 111 accesses the proxy server 103, the service platform 113, the services 115, the content provider 117, or any other component of the system 100. In this example, the client 111 need not make a specific request for any suggestions or recommendations. Instead, the recommendation platform 101 can automatically initiate the process 300 based using the system 100 to access content.

By way of example, the recommendation processes contextual data (e.g., provided in an access request, reported to a server, inferred from the proxy server 103, etc.) associated with the client 111, the request, or a combination thereof to determine the context from which the client 111 is accessing content over the system 100. In some embodiments, the recommendation platform 101 can process historical user data, preference information, calendar information, and the like to predict a future context of the client 111. In one embodiment, the contextual data is processed to identify at least in part a location and/or other contextual parameters (e.g., time, activity, intent, etc.) to describe a context associated with the client 111.

The recommendation platform 101 then determines popularity data associated with one or more content items with respect to the one or more locations, the one or more contextual parameter values, or a combination, wherein the popularity data is determined from one or more other devices sharing at least substantially the one or more locations, the one or more contextual parameter values, or a combination thereof (step 303). As described above, the recommendation platform 101 maintains records (e.g., access history database 107) of content requests made by a group of clients 111 that are associated with or stratified across one or more determined contexts.

In one embodiment, the recommendation platform 101 causes, at least in part, a correlation of the one or locations to one or more boxes, wherein the one or more boxes represented respective one or more bounded geographical areas; and wherein the popularity data is determined with respect to the one or more boxes (step 305). For example, the recommendation platform 101 can use the contextual data of step 301 to determine what geographic box the user is located in to facilitate localized recommendations or suggestions. In one embodiment, the sizes or boundaries of the box may be determined based, at least in part, how localized the recommendations should be. In other embodiments, the box sizes can be determined dynamically based on the number of content items assigned to each box.

By way of example, the recommendation platform 101 determines the popularity data based, at least in part, on a number of requests for the one or more content items by the at least one device, the one or other devices, or a combination thereof when sharing the at least substantially the one or more locations, the one or more contextual parameter values, or a combination thereof (step 307). For example, as the number of requests made for a content item increases so does its popularity or traction. As noted previously, the recommendation platform 101 can compute the popularity data or traction for content items on-the-fly as requests for the content items are detected. In this way, the recommendation platform 101 has access to real-time or substantially real-time data from which to make relevant recommendations or suggestions.

In one embodiment, the recommendation platform 101 determine distance information between the at least one device and the one or more content information based, at least in part, on one or more distances between (a) the one or more item locations and the one or more locations of the client 111; (b) the one or more item contextual parameters and the one or more contextual parameters of the client 111; or (c) a combination thereof, wherein the recommendation of the one or more content items is further based, at least in part, on the distance information (step 309). In one embodiment, the content items and the clients 111 are associated with respective locations or contexts. The differences between the locations or contexts can be used to further refine the contextual content suggestion process. For example, distance can be used to weigh popularity values of nearby content items such that highly popular items that are relatively far away, or very close content items are of lower popularity may still be recommended.

In step 311, the recommendation platform 101 causes, at least in part, a recommendation of the one or more content items to the at least one device based, at least in part, on the popularity information (e.g., traction), the distance information (e.g., affinity), and/or other related information. The recommendation can then be presented to the client 111 with little to no user intervention.

Figure 4:
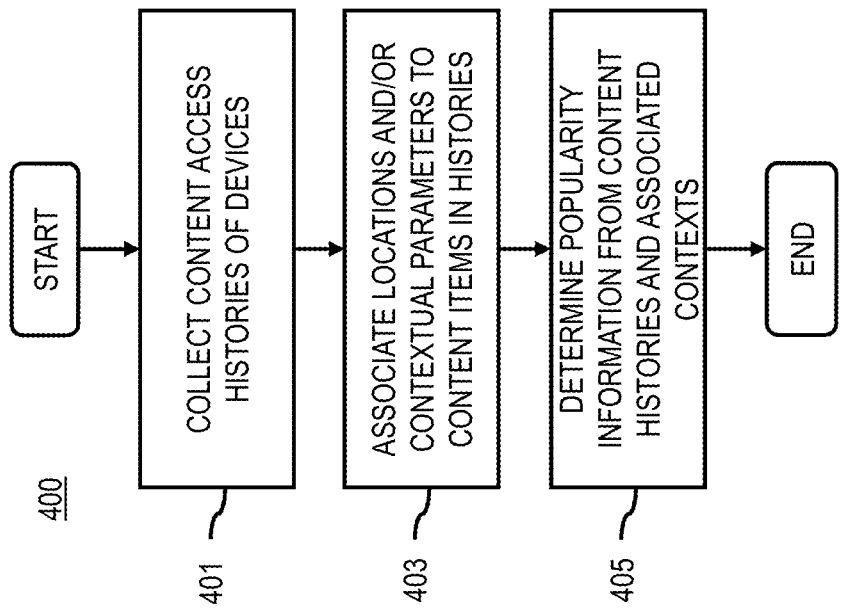
FIG. 4 is a flowchart of a process for collecting content access histories to facilitate providing contextual content suggestions, according to one embodiment.

FIG. 4 is a flowchart of a process for collecting content access histories to facilitate providing contextual content suggestions, according to one embodiment. In one embodiment, the recommendation platform 101 performs the process 400 and is implemented in, for instance, a chip set including a processor and a memory as shown FIG. 11. In addition or alternatively, the proxy server 103 may perform all or a portion of the process 400. At step 401, the recommendation platform collects content usage or access histories from a group of UEs 109 or clients 111.

As previously discussed, when a client 111 requests access to or accesses a content item (e.g., visits a URI), the content item is added to the system, the recommendation platform determines or updates the geoposition (P) or other contextual parameters (e.g., time, activity, intent) associated with the content item. In addition, the recommendation platform 101 computes or updates a popularity index or traction for the content item.

In step 403, the recommendation platform causes, at least in part, an association of one or more item locations, one or more item contextual parameters, or a combination thereof with the one or more content items based, at least in part, on the one or more locations, the one or more contextual parameters, or a combination thereof associated with at least one device, the one or more other devices, or a combination thereof when requesting the one or more content items. For example, when a URI is visited by a web browser (e.g., a client 111), the recorded content item is given an initial traction value and a respective geoposition is recorded. As more users access the same content item the traction value and/or geoposition can be updated accordingly.

In step 405, the recommendation platform 101 determines the popularity data used in the process 300 of FIG. 3 based, at least in part, on the content access histories and associated contexts. In other words, the recommendation platform 101 logs content items that are popular among a group of users sharing a context (e.g., a location, time, etc.). Then when another client 111 accesses the system with the same or similar content, the recommendation platform 101 can determine which content items are most popular for the given context and make contextual content suggestions accordingly.

Figure 5:
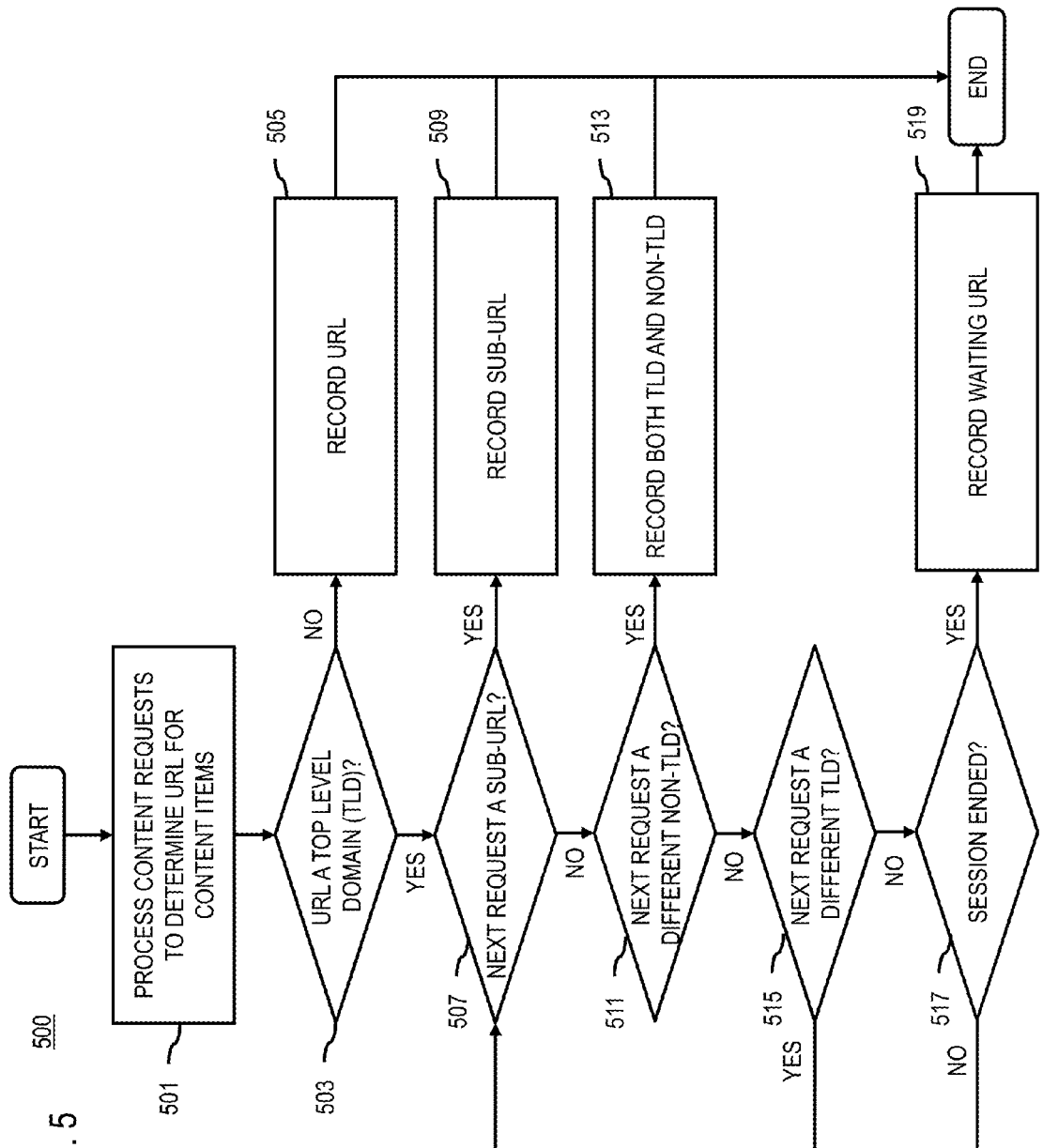
FIG. 5 is a flowchart of a process for top level domain filtering of content access histories, according to one embodiment.

FIG. 5 is a flowchart of a process for top level domain filtering of content access histories, according to one embodiment. In one embodiment, the recommendation platform 101 performs the process 500 and is implemented in, for instance, a chip set including a processor and a memory as shown FIG. 11. In addition or alternatively, the proxy server 103 may perform all or a portion of the process 500.

In one embodiment, when content items are accessed is accessed via URLs, the recommendation platform 101 can perform filtering of top level domains (TLDs) to avoid having gateway URLs trend up more in popularity than destination URLs. For example, if four users load a news site and then three of the users click on the main story and the fourth one clicks on another story, the news site will trend up higher and faster since four different users loaded it. However, it may be more relevant for recommendations for the main story to be the one that trends up. Users might already know the news site, so a recommendation of the new site as a content item may not be of interest to the users, whereas a certain news article from the site might be more interesting to more users.

Accordingly, in one embodiment, the recommendation platform 101 processes and/or facilitates a processing of requests for one or more content items to determine one or more uniform resource locators (URLs) associated with the one or more content items (step 501). The recommendation platform 101 can then determine the popularity data or whether to record the content access request in the system 100 for the content items based, at least in part, whether the one or more URLs are one or more top level domains (step 503).

If the URL is not a TLD, then the recommendation platform 101 records the URL as a content item in the system 100 (step 505). If the URL is a TLD, the recommendation platform 101 does not report the URL immediately. Instead, the recommendation platform 101 waits for the user's next request to determine whether the next request is a sub-URL (step 507). If the user's next request is a sub-URL of the previously requested TLD, the top level domain is a sub-URL, then the recommendation platform 101 records the sub-URL as a content item in the system 100 (step 509).

If the next request is not a sub-URL of the previous TLD, the recommendation platform 101 determines whether the next request (e.g., the request after the TLD request) is a non-TLD that is from a completely different site or domain (step 511). If yes, the recommendation platform 101 records both the TLD and the new request as content items in the system 100 (step 513).

If no, the recommendation platform 101 determines with the new request is a TLD, but different from the previous TLD request (step 515). If yes, the recommendation platform 101 returns to step 507 to repeat the process with the new TLD.

If the user stops using the browser (e.g., when the user session expires in the proxy server 103) (step 517), then the recommendation platform 101 determines whether it was waiting to decide whether or not report a URL to the system 100. If the recommendation platform 101 was waiting, then the recommendation platform 101 will report or record whatever URL was waiting the queue as a content item in the system 100.

In one embodiment, the recommendation platform 101 can also distinguish between an organic URL request versus a click-through URL request when reporting content items to the system 100. By way of example, an organic URL request is one which was generated using standard browsing—e.g., the URL was entered in the address bar of a browser or client application 111 or through a link that is not displayed as part of list of content items recommended by the system 100. On the other hand, a click-through URL request is one which was generated by clicking on a link recommended by the system 100.

In one embodiment, the system 100 supports the ability to add different traction amounts to URLs depending on whether they are organic or click-through request. Both traction amounts, for instance, are configurable in the system 100. Usually, the click-through request for a URL will have a lower traction added to that URL than for an organic request.

Figure 6:
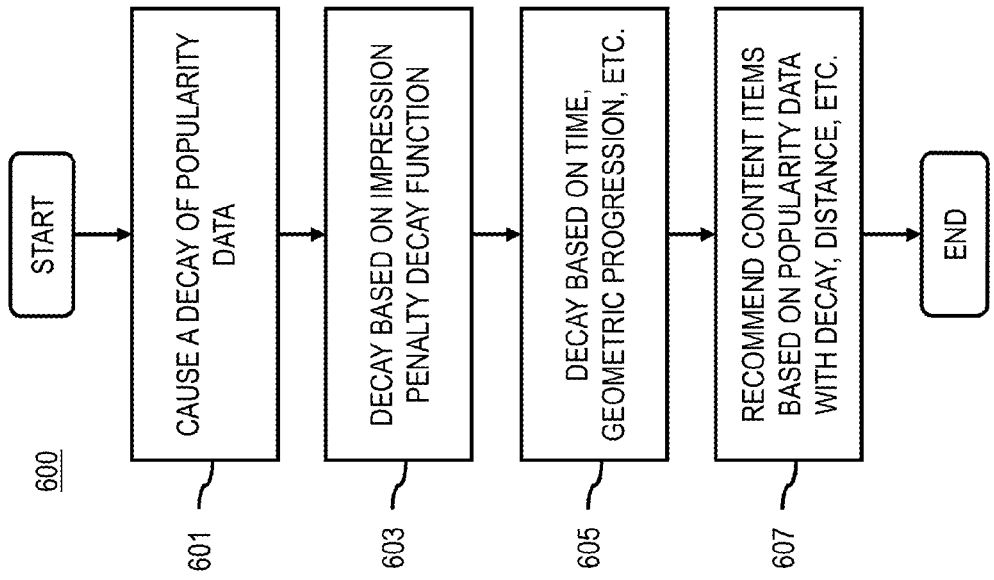
FIG. 6 is a flowchart of a process for decaying popularity data used for determining contextual content suggestions, according to one embodiment.

FIG. 6 is a flowchart of a process for decaying popularity data used for determining contextual content suggestions, according to one embodiment. In one embodiment, the recommendation platform 101 performs the process 600 and is implemented in, for instance, a chip set including a processor and a memory as shown FIG. 11. In addition or alternatively, the proxy server 103 may perform all or a portion of the process 600.

In order to effectively maintain a set of content items (e.g., URIs) in the system 100 that are relevant over time, the recommendation platform uses various methods for reducing the popularity of URIs as they go unused overtime. Otherwise, there is the potential to have an ever growing amount of overall traction or popularity in the system 100. Accordingly, in one embodiment, the recommendation platform 101 causes, at least in part, a decay of the popularity information using, for instance, one or more decay methods (step 601).

In one embodiment, the recommendation platform 101 uses a decay function that is based on an impression penalty. In other words, the recommendation platform 101 determines the decay of the popularity data based, at least in part, on whether the at least one device requests access to the one or more content items in response to a recommendation of the one or more content items (step 603). For example, an impression refers to when a client 111 is presented with a recommended content item in the client 111's recommended list. In this case, the user sees the recommended content item in the recommended list, but does not necessarily click on or otherwise access the recommended content item. In one embodiment, the impression penalty mechanism penalizes content items that reside in the recommended list without being requested or accessed by the user. Content items typically get a benefit from making it onto the recommended list in the form of exposure to the user. This exposure often increases the likelihood of the content item being accessed, thus increasing the content item's traction or popularity. However, if a link fails to be accessed by the user, it suggests that the content item might not be interesting to users and should be removed from the recommended list faster than content items that do get accessed. Consequently, the recommendation platform 101 uses the impression penalty decay to facilitate this process.

In one embodiment, the impression penalty decay function reduces the amount of traction for content items that are presented in a recommended list for the user to see. The content items that are qualified to be on the recommended list, but are not actually presented to the user are not penalized under this decay function. Each content item in the recommended list has its traction decreased by a configurable amount before the system 100 responds to a client with a new or updated content recommendation list. In one embodiment, the amount that is decreased is equal for all content items in the recommended list, but can be configured to be different depending on where the content item ranks in the list. For example, the content item that is first in the recommended list (e.g., that a user will see) can have its impression penalty be higher than for a content item that is last in the recommended list.

In other embodiments, the recommendation platform 101 uses a decay function based, at least in part, on one or more temporal parameters, or a combination thereof (step 605). More specifically, the recommendation platform 101, in one embodiment, can apply a time-based decay function on each content item, so that as time elapses, the traction for content items will decrease. The decay function can be linear, exponential, or some other mode.

In step 607, the recommendation platform 101 recommends content items based, at least in part, the popularity data with decay applied via the one or more decay functions described above in combination with the distance and other affinity determination mechanisms previously described.

Figure 7:
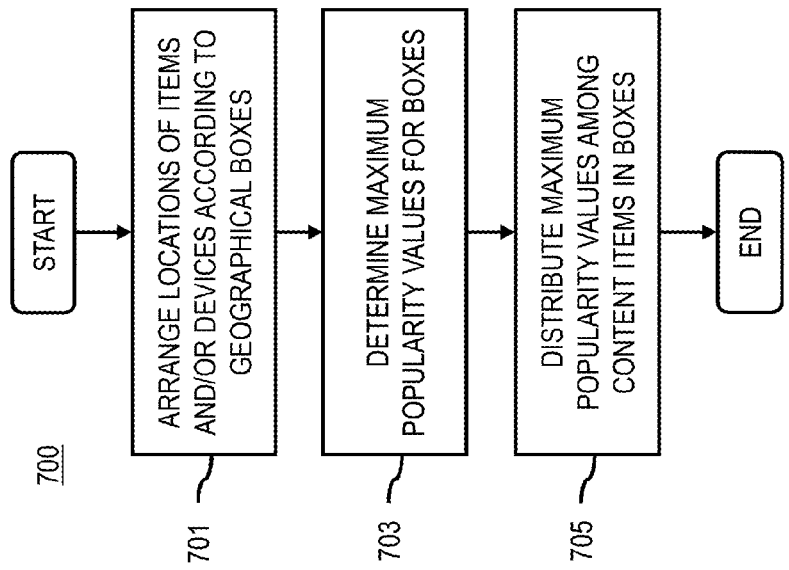
FIG. 7 is a flowchart of a process for managing popularity data decay by specifying maximum popularity values, according to one embodiment.

FIG. 7 is a flowchart of a process for managing popularity data decay by specifying maximum popularity values, according to one embodiment. In one embodiment, the recommendation platform 101 performs the process 700 and is implemented in, for instance, a chip set including a processor and a memory as shown FIG. 11. In addition or alternatively, the proxy server 103 may perform all or a portion of the process 700.

At step 701, the recommendation platform 101 causes, at least in part, a correlation of the one or locations associated with one or more content items to one or more boxes. As describe previously, in one embodiment, the one or more boxes represented respective one or more bounded geographical areas. The recommendation platform 101 then determines popularity data for the content items with respect to the boxes.

In step 703, the recommendation platform 101 determines a maximum popularity value for the one or more boxes. In other words, the recommendation platform 101 manages traction decay for content items by imposing a maximum total amount of traction for a given geographic box. In this model, each box is assigned a maximum total value that it can contain as computed by, for instance, the sum of the traction of all content items in the given box. There are several approaches for managing maximum box traction (see discussion below with respect to FIG. 8).

The recommendation platform 101 then determines the popularity data based, at least in part, on a distribution of the maximum popularity value among the one or more content items associated with the respective one or more boxes (step 705).

Figure 8:
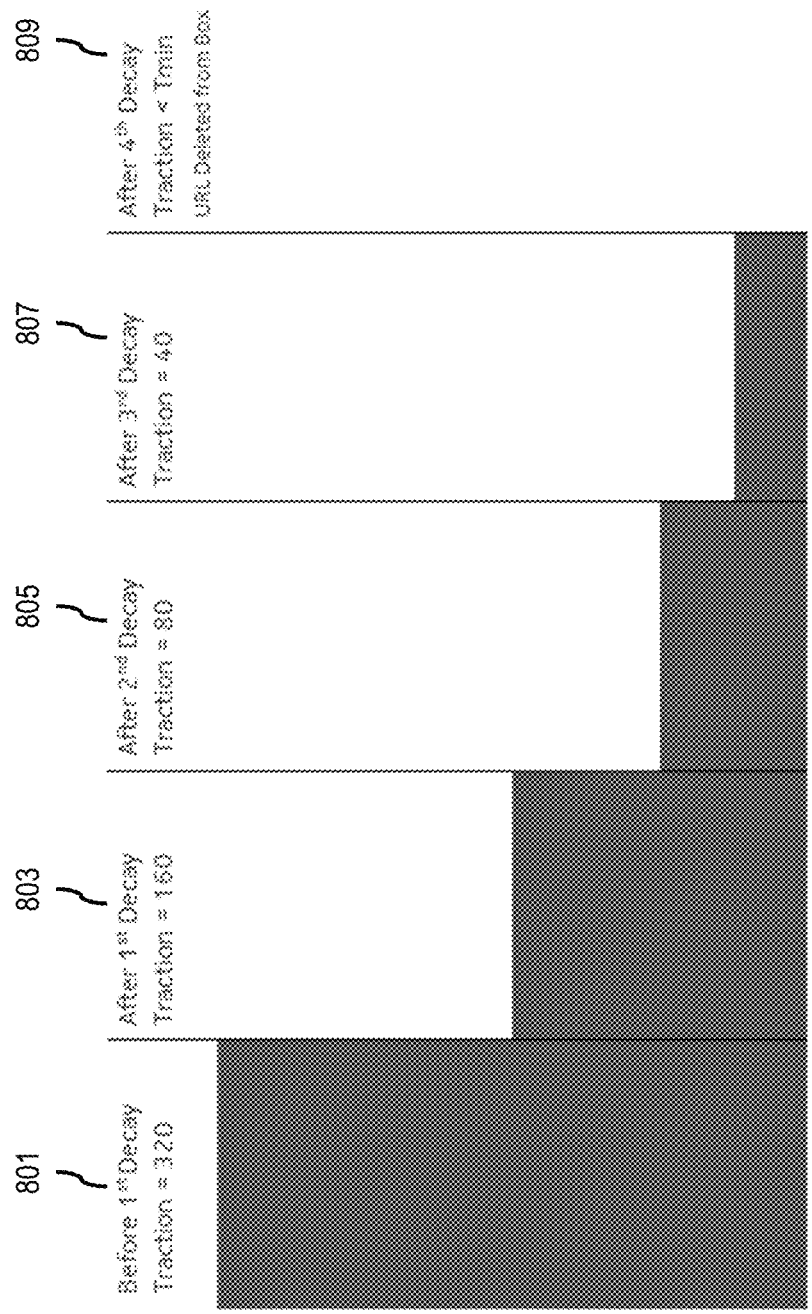
FIG. 8 is a diagram depicting a decay of popularity data via geometric progression, according to one embodiment.

FIG. 8 is a diagram depicting a decay of popularity data via geometric progression, according to one embodiment. In one embodiment, the decay function applies the maximum box traction decay function using the mathematical concept of geometric progression. In one embodiment, each geographical box would have a fixed maximum traction value (Tmax). Once Tmax is reach, the box would need to get traction for new content items coming into the box. In one embodiment, the way to acquire new traction would be to deduct a constant proportion (e.g., a third, a half) of the traction from each content item already existing in the box. This way, the entire box now has a constant proportion of Tmax traction to give to new incoming content items (e.g., content items assigned to the box). In this scheme, content items could not go above a maximum individual traction. Also, there would be a minimum individual fraction threshold that would cause content items to be deleted from the box once they fall below the minimum threshold, and their remaining traction would be give back to the box.

Using this scenario and assuming a content item does not acquire new traction, a content item's traction would follow a geometric progression when decaying. FIG. 8 depicts an example of a system where the minimum traction for a content item or URL is 30 and where the constant decay proportion is half (50%). As shown, before the first decay 801, the traction for the content item (e.g., a URL) is 320. After the first decay 803, this particular content item gives 160 traction points back to the box. After the second decay 805, the content item gives 80 traction points back to the box. After the third decay 807, the content item gives 40 traction points back to the box. After the fourth decay 809, the content item gives all of its remaining traction (e.g., 40) back to the box. Moreover, because the after the fourth decay 809, the traction falls below the minimum individual threshold level of 30, the recommendation platform 101 deletes the content time from the box and returns any remaining traction to box.

As discussed above, geometric decay is one possible embodiment of maximum total traction decay function. In another embodiment, the recommendation system can use a pay-to-play function. For example, a box is assumed to have a configurable maxim traction as shown in Table 1 below.

TABLE 1

| |
|---|
| Available Traction: 2000 |

In one embodiment, every time, the recommendation platform adds a new content item to the box, the recommendation platform 101 takes from the available traction (e.g., needs 100 fraction points every time a new content item is inserted or updated in the box). In this example, a last access time (LAT) contextual parameter is also recorded with each content item. An example is provided below in Table 2.

TABLE 2

| |
|---|
| Available Traction: 1400 |
| www.google.com - 100 - LAT = 14:00 |
| www.cnn.com - 100 - LAT = 1:00 |
| www.nokia.com - 100 - LAT = 12:00 |
| www.msn.com - 100 - LAT = 10:00 |
| www.bbc.co.uk - 100 - LAT = 6:00 |
| www.facebook.com - 100 - LAT = 3:00 |

In this example, some of the content items (e.g., URLs) are visited more times. Accordingly, the recommendation platform 101 modifies their traction and LAT. Also, a new content item is added (e.g., www.yahoo.com). The resulting traction allocation is provided in Table 3 below.

TABLE 3

| |
|---|
| www.google.com - 400 - LAT = 22:00 |
| www.cnn.com - 300 - LAT = 18:00 |
| www.yahoo.com - 100 - LAT = 15:00 |
| www.nokia.com - 500 - LAT = 13:00 |
| www.bbc.co.uk - 200 - LAT = 12:00 |
| www.facebook.com - 100 - LAT = 11:00 |
| www.msn.com - 400 - LAT = 9:00 |

At this point there is not more space or available traction points. In this scenario, the user now accesses a new content item (e.g., www.nytimes.com), and the recommendation platform 101 inserts the new content item in the box as shown in Table 4 below.

TABLE 4

| |
|---|
| www.nytimes.com - 100 - LAT = 23:00 |
| www.google.com - 400 - LAT = 22:00 |
| www.cnn.com - 300 - LAT = 18:00 |
| www.yahoo.com - 100 - LAT = 15:00 |
| www.nokia.com - 500 - LAT = 13:00 |
| www.bbc.co.uk - 200 - LAT = 12:00 |
| www.facebook.com - 100 - LAT = 11:00 |
| www.msn.com - 400 - LAT = 9:00 |

At this point the box is beyond its traction capacity (capacity is 2000, current total traction 2100), so the recommendation platform 101 needs to release some traction. In one embodiment, the recommendation platform 101 looks for the content items that have not been accessed in the longest time. In the example above, it would be links like MSN, Facebook, BBC, etc. The main point of this decay function is to penalize URLs that are no longer being actively requested by users, so the recommendation platform 101 takes some configurable amount of traction from each of them to obtain the necessary 100 traction points to normalize the box back to its allowed total traction. In order to achieve this, the recommendation platform takes a configurable amount of traction from the content items that have not been accessed in the longest time. In this example, the recommendation platform 101 takes 20 traction points as penalty from these content items as shown in Table 5 below.

TABLE 5

| |
|---|
| www.nytimes.com - 100 - LAT = 23:00 |
| www.google.com - 400 - LAT = 22:00 |
| www.cnn.com - 300 - LAT = 18:00 |
| www.yahoo.com - 80 - LAT = 15:00 |
| www.nokia.com - 480 - LAT = 13:00 |
| www.bbc.co.uk - 180 - LAT = 12:00 |
| www.facebook.com - 80 - LAT = 11:00 |
| www.msn.com - 380 - LAT = 9:00 |

The Table 5 above has been normalized to its maximum allowed traction. The content items from which the recommendation platform 101 took the traction points from have now begun to decay. In one embodiment, every time a process acts on the content items, the recommendation platform 101 updates the corresponding LAT. So, in the case above, because the recommendation platform 101 had to give up some of their traction, the recommendation platform 101 updates their LAT and moves them to the top of the table as shown in Table 6 below.

TABLE 6

| |
|---|
| www.yahoo.com - 80 - LAT = 23:04 |
| www.bbc.co.uk - 180 - LAT = 23:03 |
| www.facebook.com - 80 - LAT = 23:02 |
| www.msn.com - 380 - LAT = 23:01 |
| www.nytimes.com - 100 - LAT = 23:00 |
| www.google.com - 400 - LAT = 22:00 |
| www.cnn.com - 300 - LAT = 18:00 |

In the above example, if the content items that gave some of their traction up are not clicked on or loaded again but other content items are, they will once again become the oldest content items. Accordingly, when traction is needed, they will have to give up more of their traction until they eventually reach a minimum traction allowed and are removed from the box.

Figure 9C:
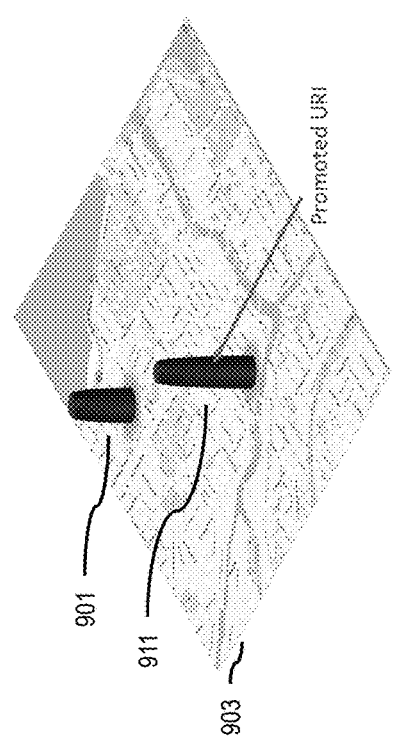

FIGS. 9A-9D are diagrams of depicting an overview of providing contextual content recommendations, according to various embodiments. FIG. 9A depicts an example in which a UE 109a requests access to a content item 901 with a location context defined by geographical box 903. As previously described, when a UE 109a or a client 111 executing in the UE 109a accesses or requests access to a content item 901, the recommendation platform 101 records the geoposition ($P=p_0$) of the request and assigns an initial traction value ($T=t_0$) to the content item 901. In the example of FIG. 9A, the height of the icon representing the content item 901 represents the traction assigned.

In one embodiment, an access request for a URI is based on visiting the URI. By way of example, a visit constitutes any way a client 111 can load a URI (e.g., directly typed in, from favorites, a link on another page, reference from another application, etc.). In addition to the key parameters (e.g., P and T), the recommendation platform 101 can also record the time the content was added, the URI title, any icon, textual description, and/or any other contextual parameter associated with the request. Additionally, the system 100 may keep a static image of the content item as it appeared at the time of the visit. Content items added to the system 100 in this way are referred to as crowdsourced links.

As shown in FIG. 9B, if the same content item 901 is accessed by another UE 109b in the same box 903 or other contextual parameter, the content item 901's position and traction will be adjusted. For example, the previous traction of the content item 901 will be incremented by a set value $t_n$ to reflect the increased popularity (e.g., $T=T_{prev}+T_n$). The increased popularity is depicted in FIG. 9B as an increase in height of the icon representing the content item 901. Additionally, the position of the content item 901 will be adjusted by computing the "center of mass" between the previous position of the content item (e.g., the position of the UE 109a when accessing the content item 901) and the new position (e.g., the position of the UE 109b when accessing the content item 901) via, for instance, the equation: $p_n$: $P=(p_n t_n + P_{prev} T_{prev})/T$.

As shown in FIG. 9C, in addition to adding content items via the crowdsourcing method, a content item can be promoted into the system with chosen position and initial traction. The traction value of the promoted link is configurable and can be larger than the default value given by a visited link entered into the system. For example, promoted content item 911 in FIG. 9C is defined at a particular location with greater traction than content item 901.

Figure 9D:
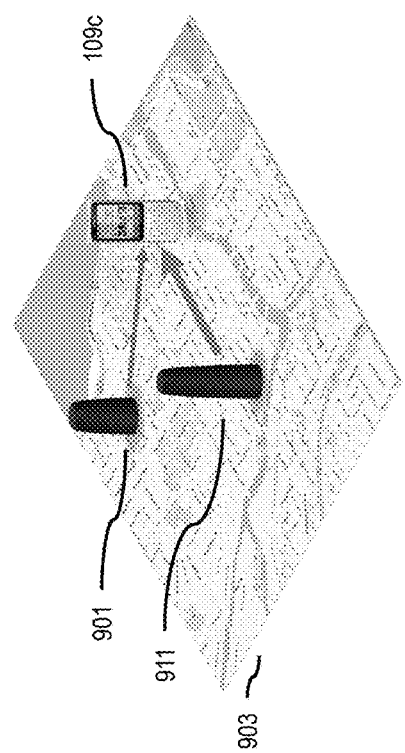

As shown in FIG. 9D, a UE 109c can request or be provided with a list of suggested content items from the recommendation platform 101. In one embodiment, the UE 109c can report its geolocation or other contextual parameters to the recommendation platform 101. The recommendation platform 101 then uses finds the best n matches or suggestions (where n is a preconfigured number). To find the best matches, the recommendation platform 101 computes an affinity (A) of each content item. In some embodiments, the affinity is based, at least in part, on the contextual distances discussed previously. In one embodiment, affinity is proportional to the traction of each content item and inversely proportional to the contextual distance (e.g., physical distance between the content item position and the position or predicted position of the UE 109c). In one embodiment, the relationship among the affinity, the traction, and/or the contextual distance can be linear, quadratic, or any other function that falls off over distance including discrete steps.

In one embodiment, to make a recommendation of content items, the recommendation platform 101 first looks at content items (e.g., content items 901 and 911) in the box 903 containing the requesting UE 109c. If the box 903 does not contain enough matches, the recommendation platform 101 can follow one over several strategies discussed above (e.g., taking content items from adjacent boxes, promoting content items, etc.).

Figure 10:
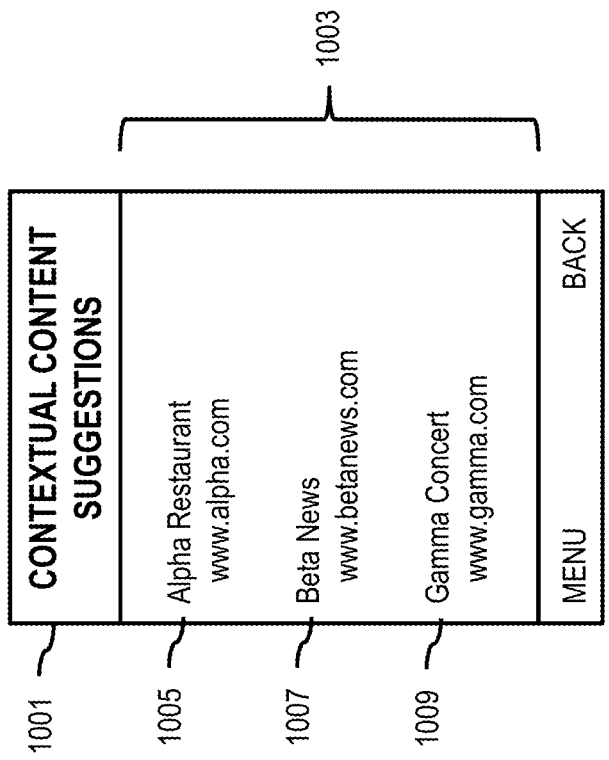
FIG. 10 is a diagram of a user interface reflecting the processes of FIGS. 1-9, according to one embodiment.

FIG. 10 is a diagram of a user interface reflecting the processes of FIGS. 1-9, according to one embodiment. As shown, a user interface 1001 presents a list 1003 of content items 1005-1009 that are determined using the various embodiments described herein. For example, a user can launch a client 111 to request contextual content suggestions from the recommendation platform 101. In one embodiment, the user need not make an explicit request for the suggestions other than opening or other accessing a service associated with the recommendation platform 101. On accessing the service, the client 111 can be configured to report its location and/or other contextual parameters (e.g., time, activity, intent, etc.) to recommendation platform 101.

Based on the reported contextual parameters, the recommendation platform 101 can search for content items that are most popular among other clients 111 for the given context. In this example, based on the context of the client 111, the recommendation platform 101 has presented content items 1005-1009 as the most popular among users sharing the same context (e.g., at the same location and time). If the user views the presented content items 1005-1009 but does not access or click on any of the suggestions, the recommendation platform can apply one or more decay functions (e.g., impression penalty decay) as described above. In this way, the user associated with the client 111 can be presented with different suggestions when another recommendation list is provided.

The processes described herein for providing contextual content suggestion may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
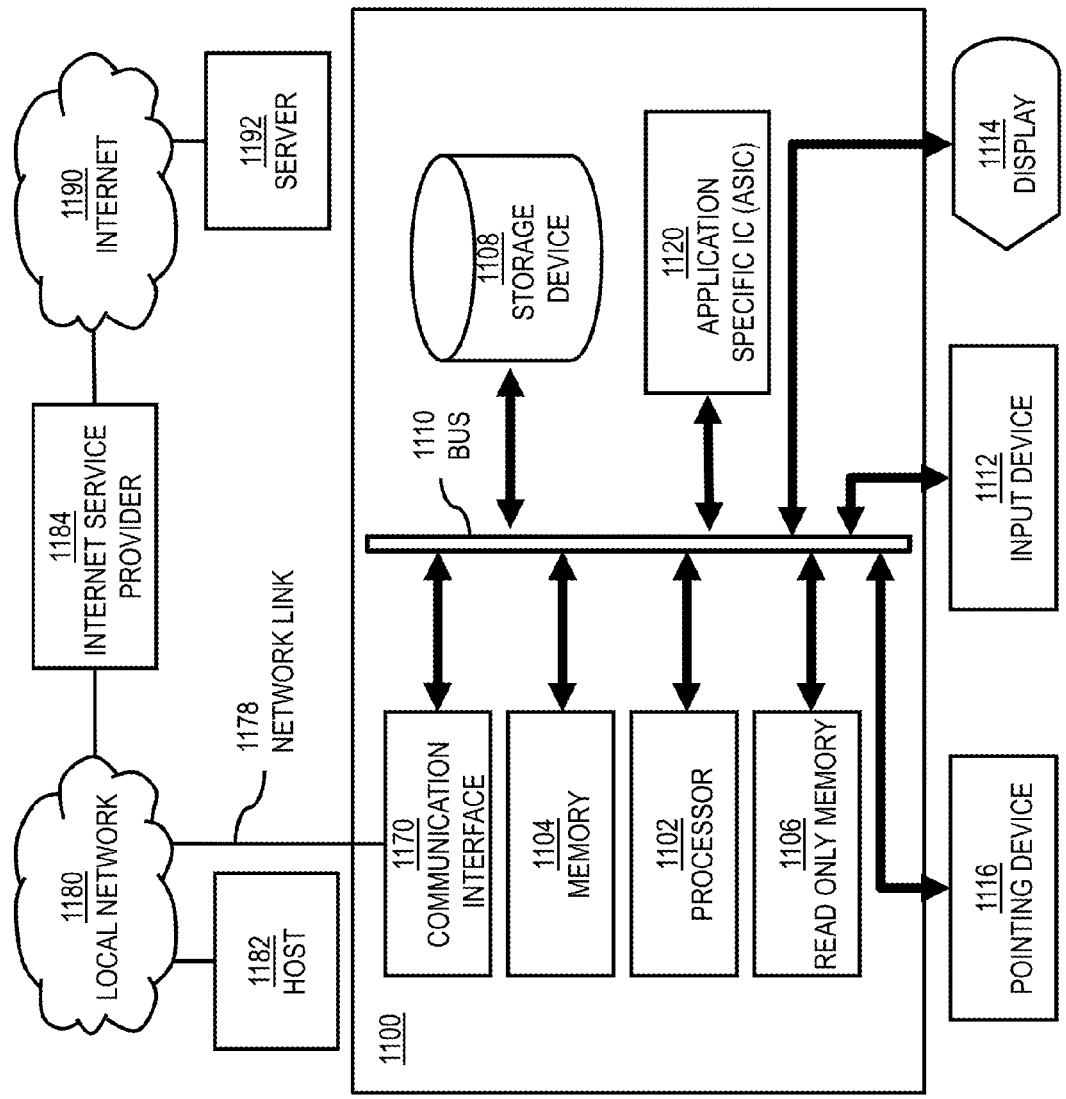
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to provide contextual content suggestion as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of providing contextual content suggestion.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to providing contextual content suggestion. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for providing contextual content suggestion. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing contextual content suggestion, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for providing contextual content suggestion to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

Figure 12:
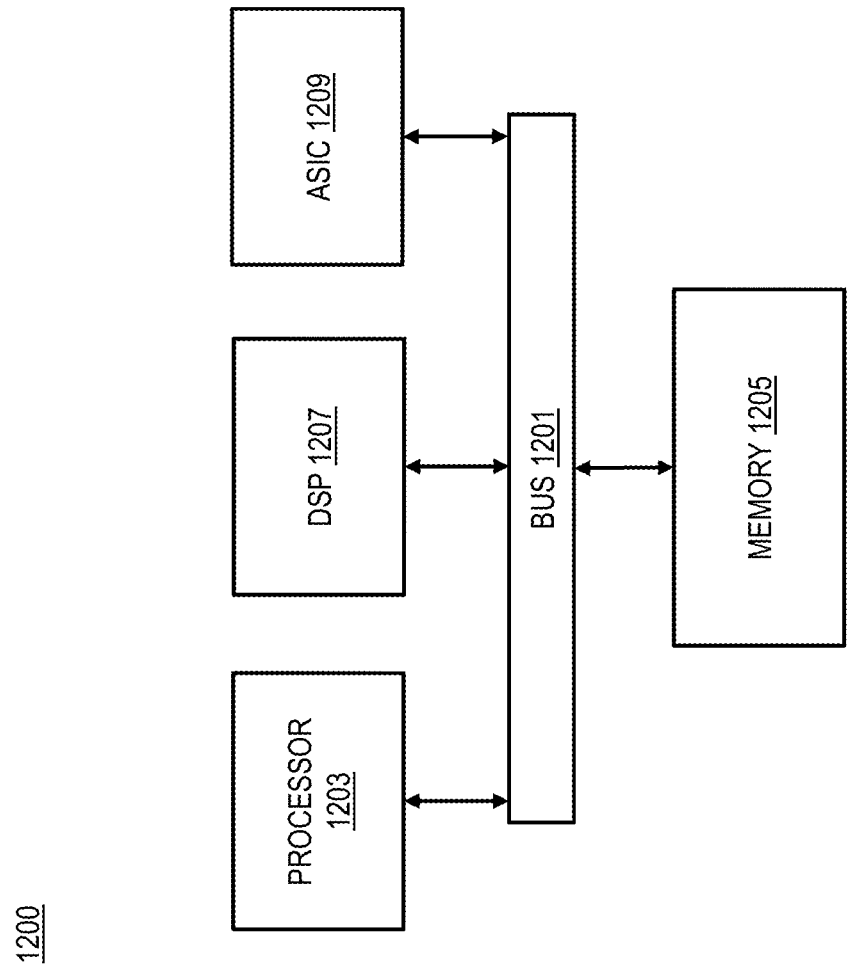
FIG. 12 is a diagram of a chip set that can be used to implement an embodiment of the invention.

FIG. 12 illustrates a chip set or chip 1200 upon which an embodiment of the invention may be implemented. Chip set 1200 is programmed to provide contextual content suggestion as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of providing contextual content suggestion.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide contextual content suggestion. The memory 1205 also stores the data associated with or generated by the execution of the inventive steps.

Figure 13:
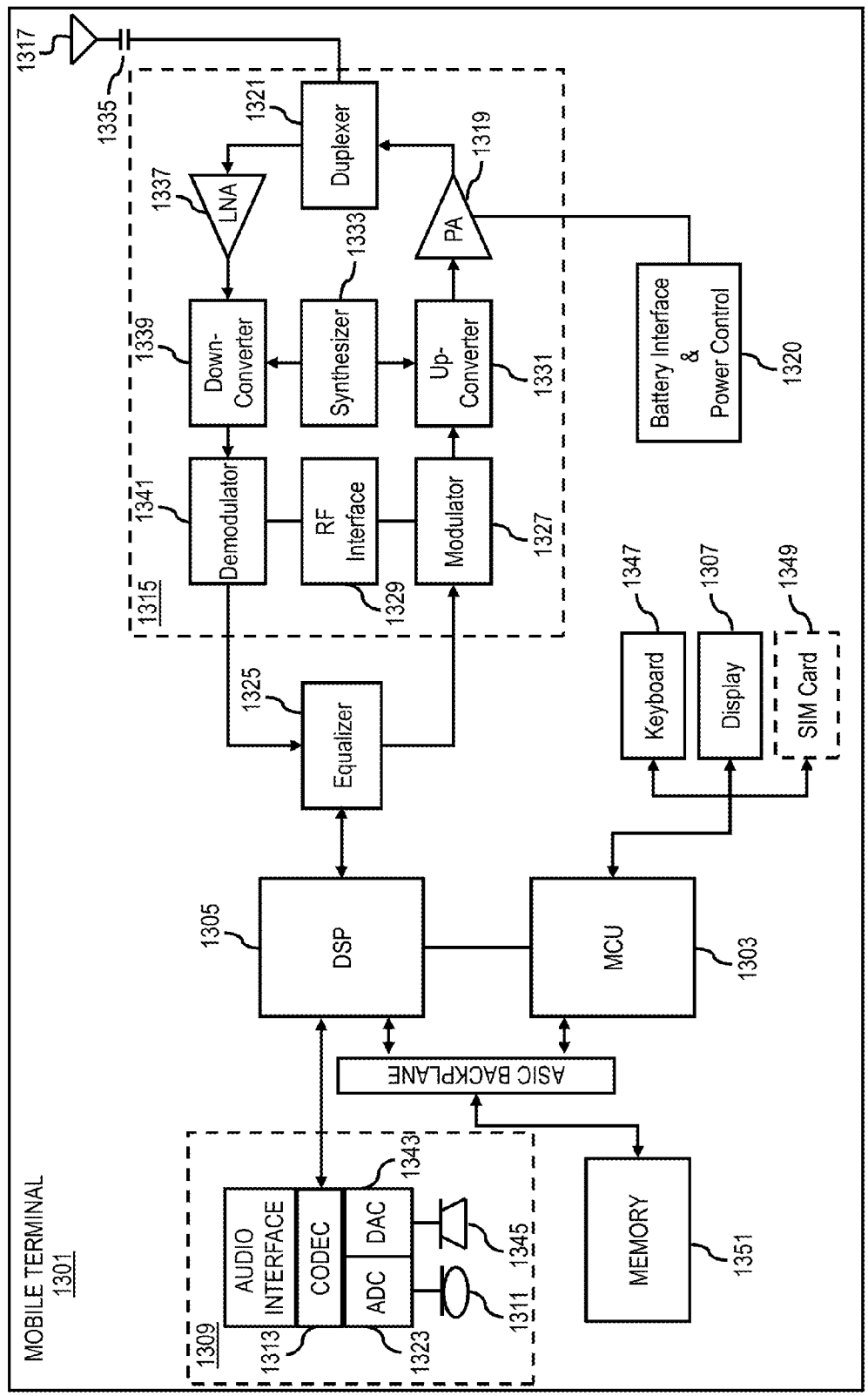
FIG. 13 is a diagram of a mobile station (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of providing contextual content suggestion. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of providing contextual content suggestion. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to provide contextual content suggestion. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   storing, as part of a database, a plurality of records, corresponding to a plurality of users, relating to each of the users' access to one or more content items, wherein the records include contextual information with respect to a plurality of devices utilized by the respective users to access the content items;
   creating a content items list of the one or more content items;
   assigning a traction value to each of the one or more content items in the content items list, wherein the traction value relates to whether the one or more content items are to remain in the content items list;
   determining popularity data associated with the one or more content items with respect to the contextual information based on the traction value specified for the one or more content items;
   applying a decay function to the popularity data to update the content items list with to respect to removal of one of the one or more content items from the content items list; and
   initiating transmission of the updated content items list as part of a recommendation of the one or more content items for presentation at a new device distinct from the plurality of devices.

2. A method of claim 1, further comprising:
   assigning a maximum collective traction value for the one or more content items in the content items list;
   determining that a new content item is to be added to the content items list; and
   deducting a constant proportion of the traction values of each of the one or more content items in the content items list to maintain the maximum collective traction value while including the new content item in the content items list,
   receiving an input for the assignment of each of the traction value from at least one promoter of the content items list.

3. A method of claim 1, wherein the contextual information includes location information to associate with the respective traction value.

4. A method of claim 1, wherein the decay function is based on a pay-to-play basis in which the decay of the popularity data is set according to a sponsor of one of the one or more content items.

5. A method of claim 1, wherein the popularity data is further determined from a portion of the plurality of devices sharing at least substantially the contextual information.

6. An apparatus comprising:
   at least one processor; and
   at least one memory including computer program code for one or more programs,
   the at least one memory and the computer program code configured to, with the at least one processor, cause the apparatus to perform at least the following,
   store, as part of a database, a plurality of records, corresponding to a plurality of users, relating to each of the users' access to one or more content items, wherein the records include contextual information with respect to a plurality of devices utilized by the respective users to access the content items;
   create a content items list of the one or more content items;
   assign a traction value to each of the one or more content items in the content items list, wherein the traction value relates to whether the one or more content items are to remain in the content items list;
   determine popularity data associated with the one or more content items with respect to the contextual information based on the traction value specified for the one or more content items;
   apply a decay function to the popularity data to update the content items list with to respect to removal of one of the one or more content items from the content items list; and
   initiate transmission of the updated content items list as part of a recommendation of the one or more content items for presentation at a new device distinct from the plurality of devices.

7. An apparatus of claim 6, wherein the apparatus is further caused to:
   assign a maximum collective traction value for the one or more content items in the content items list;
   determine that a new content item is to be added to the content items list; and
   deduct a constant proportion of the traction values of each of the one or more content items in the content items list to maintain the maximum collective traction value while including the new content item in the content items list,
   receive an input for the assignment of each of the traction value from at least one promoter of the content items list.

8. An apparatus of claim 7, wherein the contextual information includes location information to associate with the respective traction value.

9. An apparatus of claim 7, wherein the decay function is based on a pay-to-play basis in which the decay of the popularity data is set according to a sponsor of one of the one or more content items.

10. An apparatus of claim 6, wherein the popularity data is further determined from a portion of the plurality of devices sharing at least substantially the contextual information.

11. A non-transitory computer-readable storage medium carrying one or more sequences of one or more instructions which, when executed by one or more processors, cause an apparatus to perform:

storing, as part of a database, a plurality of records, corresponding to a plurality of users, relating to each of the users' access to one or more content items, wherein the records include contextual information with respect to a plurality of devices utilized by the respective users to access the content items;

creating a content items list of the one or more content items;

assigning a traction value to each of the one or more content items in the content items list, wherein the traction value relates to whether the one or more content items are to remain in the content items list;

determining popularity data associated with the one or more content items with respect to the contextual information based on the traction value specified for the one or more content items;

applying a decay function to the popularity data to update the content items list with to respect to removal of one of the one or more content items from the content items list; and initiating transmission of the updated content items list as part of a recommendation of the one or more content items for presentation at a new device distinct from the plurality of devices.

12. A non-transitory computer-readable storage medium of claim 11, further comprising:

assigning a maximum collective traction value for the one or more content items in the content items list; and determining that a new content item is to be added to the content items list;

deducting a constant proportion of the traction values of each of the one or more content items in the content items list to maintain the maximum collective traction value while including the new content item in the content items list, receiving an input for the assignment of each of the traction value from at least one promoter of the content items list.

13. A non-transitory computer-readable storage medium of claim 12, wherein the contextual information includes location information to associate with the respective traction value.

14. A non-transitory computer-readable storage medium of claim 12, wherein the decay function is based on a pay-to-play basis in which the decay of the popularity data is set according to a sponsor of one of the one or more content items.

15. A method of claim 1, further comprising:

transmitting the updated content items list to a proxy server configured to communicate with the new device over a communication network;

determining that the new device has not accessed one of the content items on the updated content items; and reducing the corresponding traction value of the non-accessed one content item to impose an impression penalty.

16. A method of claim 1, further comprising:

assigning a last access time value to each of the one or more content items in the content items list; and removing the one of the one or more content items from the content items list based in part on the respective assigned last access time values as part of the application of the decay function.

17. An apparatus of claim 6, wherein the apparatus is further caused to:

transmit the updated content items list to a proxy server configured to communicate with the new device over a communication network;

determine that the new device has not accessed one of the content items on the updated content items; and reduce the corresponding traction value of the non-accessed one content item to impose an impression penalty.

18. An apparatus of claim 6, wherein the apparatus is further caused to:

assign a last access time value to each of the one or more content items in the content items list; and remove the one of the one or more content items from the content items list based in part on the respective assigned last access time values as part of the application of the decay function.

19. A non-transitory computer-readable storage medium of claim 11, further comprising:

transmitting the updated content items list to a proxy server configured to communicate with the new device over a communication network;

determining that the new device has not accessed one of the content items on the updated content items; and reducing the corresponding traction value of the non-accessed one content item to impose an impression penalty.

20. A non-transitory computer-readable storage medium of claim 11, further comprising:

assigning a last access time value to each of the one or more content items in the content items list; and removing the one of the one or more content items from the content items list based in part on the respective assigned last access time values as part of the application of the decay function.

* * * * *